United States Patent [19]

Fujisawa

[11] Patent Number: 5,309,421
[45] Date of Patent: May 3, 1994

[54] RECORDING AND/OR REPRODUCING APPARATUS FOR OPTICAL DISK

[75] Inventor: Hirotoshi Fujisawa, Tokyo, Japan

[73] Assignee: Sony Corporation, Tokyo, Japan

[21] Appl. No.: 745,000

[22] Filed: Aug. 14, 1991

[30] Foreign Application Priority Data

Aug. 24, 1990 [JP] Japan .................................. 2-222828

[51] Int. Cl.⁵ .............................................. G11B 13/04
[52] U.S. Cl. .................................. 369/77.1; 369/75.1; 360/97.01; 360/114
[58] Field of Search ...................... 369/77.1, 75.1, 75.2; 360/97.02, 97.01, 903, 114, 133, 132

[56] References Cited

U.S. PATENT DOCUMENTS

| | | | |
|---|---|---|---|
| 3,729,201 | 4/1973 | Dollemayer | 274/4 H |
| 4,539,671 | 9/1985 | Higashihara | 369/75.1 |
| 4,712,146 | 12/1987 | Moon et al. | 360/97 |
| 4,837,758 | 6/1989 | Motoyama et al. | 369/13 |
| 5,122,998 | 6/1992 | Mizuno et al. | 360/114 |
| 5,164,925 | 11/1992 | Sato et al. | 360/114 |
| 5,202,863 | 4/1993 | Miyatake et al. | 360/114 |

FOREIGN PATENT DOCUMENTS

| | | | |
|---|---|---|---|
| 0336423A2 | 10/1989 | European Pat. Off. | G11B 11/10 |
| 0386987 | 4/1981 | Japan | G11B 23/03 |
| 60-173743 | 9/1985 | Japan | G11B 11/10 |
| 0322236 | 1/1991 | Japan | G11B 11/10 |

OTHER PUBLICATIONS

Patent Abstracts of Japan, vol. 13, No. 73 (P-830), Feb. 20, 1989 & JP-A-63 257 944 (Seiko Epson), Oct. 25, 1988.
Mini Micro Systems, vol. 18, No. 10, Jul. 1985, Boston, USA, pp. 133-141; Carl Warren: "Optical 3½-inch drive adds erasability".
Electronics, vol. 55, No. 26, Dec. 1982, New York, USA, pp. 45-46; John Gosch: "Magneto-optics packs 5-cm disk with 10 megabytes."
EDN Electrical Design News, vol. 35, No. 11, May 24, 1990, Newton, Mass., USA, pp. 95-97; J. D. Mosley: "Mini disk drives strive for acceptance".

Primary Examiner—Constantine Hannaher
Assistant Examiner—Don Wong
Attorney, Agent, or Firm—Philip M. Shaw, Jr.

[57] ABSTRACT

An optical disk recording and/or reproducing apparatus employing a disk cartridge having accommodated therein an optical disk not more than 80 mm in diameter as a recording medium, the apparatus including an outer casing having a length not larger than 112 mm, a width not more than 89 mm and a height not more than 31 mm which encompasses a cartridge loading section, a driving unit for rotationally driving the optical disk, an optical pickup unit and means for transporting the optical pickup unit across inner and outer peripheries of the optical disk driven rotationally by the disk driving unit for recording information signals on or reproducing information signals from a recording surface on the optical disk, a magnetic head unit for generating an external magnetic field based on information signals to be recorded, the magnetic head unit and the optical pickup unit being connected together for movement in unison therewith and arranged facing each other on opposite sides of the optical disk, controlling means for controlling a movement of the magnetic head unit perpendicular to the recording surface of the optical disk as a function of the types of the disks loaded into the apparatus, and a disk loading unit for loading the disk cartridge onto the cartridge loading section and loading the optical disk accommodated in the disk cartridge onto the disk driving unit.

4 Claims, 8 Drawing Sheets

RECORDING AND/OR REPRODUCING APPARATUS FOR OPTICAL DISK

BACKGROUND OF THE INVENTION

1. Field of the Invention

This invention relates to a recording and/or reproducing apparatus for a small sized optical disk adapted for recording and/or reproducing information signals on or from the optical disk accommodated in a disk cartridge.

2. Description of the Related Art

There has hitherto been utilized, as an optical recording medium for musical sound signals, video signals or other information signals, a read-only optical disk on which desired musical sound signals or the like are prerecorded and from which the musical sound signals are reproduced on loading the disk by the user into a reproducing apparatus.

There has also been proposed, as an optical recording medium enabling signal erasure and re-recording, a magneto-optical disk employing a magnetic thin film as a recording layer.

With the optical recording medium, such as the above mentioned optical disk or magneto-optical disk, recording and/or reproduction of information signals at an extremely high density is possible because a laser beam is utilized for recording and/or reproducing the information signals. With an optical disk devoted to reading of prerecorded information signals, such as a so-called compact disk, recording of musical sound signals continuing for about 74 minutes is possible with a disk size of 12 cm. Recording of the information signals of approximately the same volume as that for the above mentioned optical disk is possible with the above mentioned magneto-optical disk.

Meanwhile, it has been contemplated to improve further the signal recording density on the optical recording medium, such as the above mentioned optical disk or magneto-optical disk. For example, for improving recording density, there has been proposed a method of compressing information signals before recording.

If such high density recording should be achieved, the same volume of the information signals as that achieved with a conventional optical recording medium may be recorded with an optical recording medium of a smaller size than the conventional recording medium.

OBJECT AND SUMMARY OF THE INVENTION

It is a principal object of the present invention to provide a recording and/or reproducing apparatus for an optical disk which may be reduced in size and rendered portable through the use of an optical disk which is markedly reduced in diameter as compared with a conventional optical disk through high density recording.

The present invention provides a recording and/or

The present invention provides an optical disk recording and/or reproducing apparatus employing a disk cartridge having accommodated therein an optical disk not more than 80 mm in diameter as a recording medium. The optical disk recording and/or reproducing apparatus includes an outer casing having a length not larger than 112 mm, a width not more than 89 mm and a height not more than 31 mm. The outer casing includes therein a cartridge loading section for loading the disk cartridge, a driving unit for rotationally driving the optical disk accommodated in the disk cartridge, an optical pickup unit transported across inner and outer peripheries of the optical disk driven rotationally by the disk driving unit for recording information signals on or reproducing information signals from a recording surface on the optical disk, a magnetic head unit for generating an external magnetic field based on information signals to be recorded, the magnetic head unit being arranged for facing the optical pickup unit on an opposite side of the optical disk accommodated in the disk cartridge, a disk loading unit for loading the disk cartridge onto the cartridge loading section and loading the optical disk accommodated in the disk cartridge onto the disk driving unit, a battery storage section, transporting means for transporting the optical pickup unit across inner and outer peripheries of the disk accommodated in the disk cartridge, the magnetic head unit being connected to the optical pickup unit for movement in unison therewith, and controlling means for controlling a movement of the magnetic head unit perpendicular to the recording surface of the optical disk as a function of the types of the disks accommodated in the disk cartridge loaded into the apparatus.

With the present recording and/or reproducing apparatus for an optical disk, information signals are recorded or reproduced on or from the disk on loading the disk cartridge into a cartridge loading section, rotationally driving the disk in the disk cartridge by a disk driving unit and transporting the optical pickup unit across the inner and outer peripheries of the disk.

The present recording and/or reproducing apparatus for an optical disk is a portable type apparatus for recording and/or reproducing the information signals because the disk driving unit including a power source, the optical pickup unit etc. are enclosed within an outer casing which is 112 mm or less in length, 89 mm or less in width and 31 mm or less in height.

DETAILED DESCRIPTION OF THE INVENTION

Before proceeding to the description of a concrete construction of a recording and/or reproducing apparatus for an optical disk according to the present invention, a disc cartridge as a recording medium employed in the present apparatus will be explained.

Figure 1:
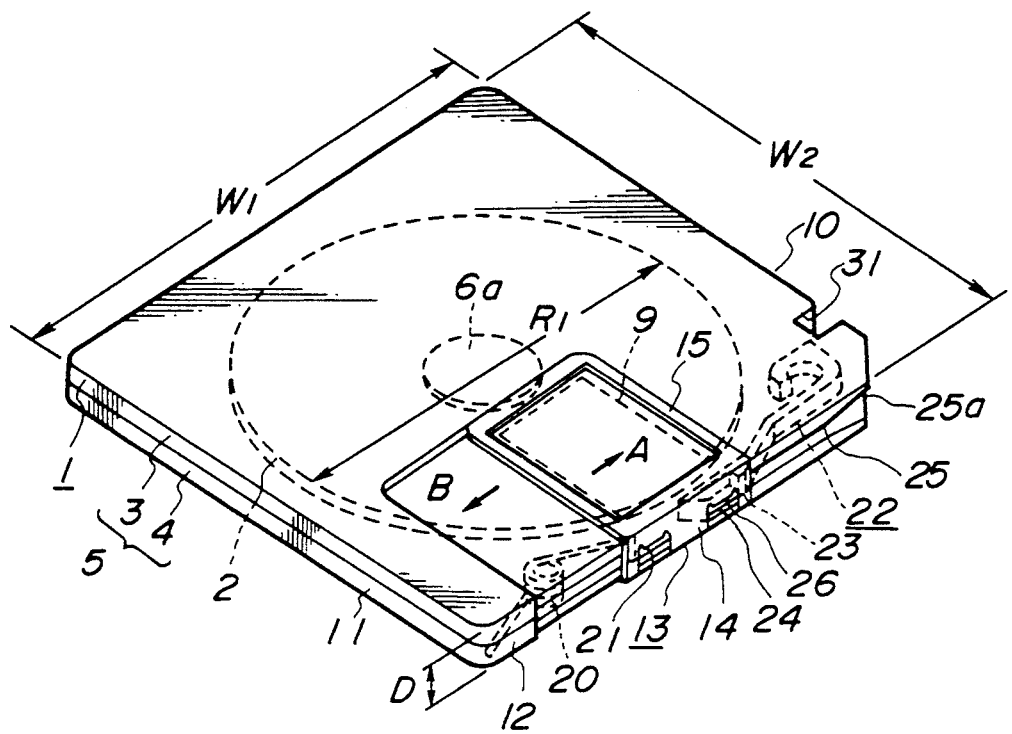
FIG. 1 is a perspective view, as seen from above, of a disk cartridge accommodating a magneto-optical disk and adapted to be loaded into a recording and/or reproducing apparatus for an optical disk according to the present invention.

Referring to FIG. 1, the disk cartridge 1 has accommodated therein an optical disk on which, even though the disk diameter R1 is about 64 mm, the same volume of information signals as that recorded on a conventional optical disk with the disk diameter of approximately 120 mm, such as a so-called compact disk, may be recorded through high density recording. That is, the present optical disk, with the thickness of a disk base plate of 1.2 mm and a track pitch of the recording track of 1.6 mm, enables recording of an information volume corresponding to the musical sound signals continuing for longer than 60 minutes and about 74 minutes.

The optical disk is arranged as a magneto-optical disk 2 making use of a photomagnetic recording film as a recording layer to enable erasure and rerecording of previously recorded signals repeatedly.

Figure 2:
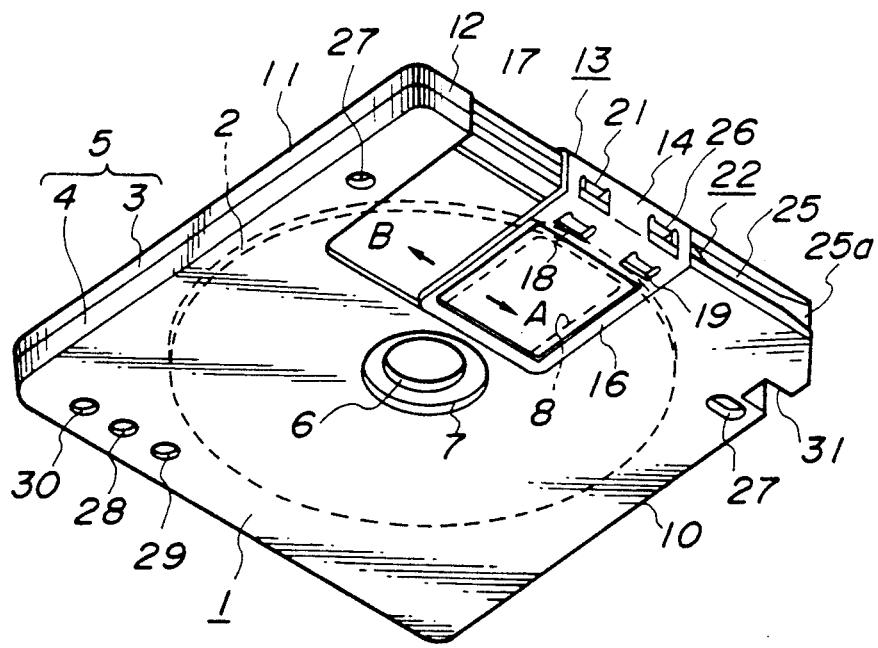
FIG. 2 is a perspective view, as seen from below, of the disk cartridge shown in FIG. 1.

Referring to FIGS. 1 and 2, the disk cartridge includes a cartridge proper 5 composed of rectangular upper and lower halves 3 and 4 abutted and connected to each other, and the above mentioned magneto-optical disk 2 rotatably accommodated within the oartridge proper 5.

Referring to FIG. 2, the lower half 4 of the cartridge proper 5 has a central opening 7 for exposing the rim of a centering hole 6 of the magneto-optical disk 2 to the outside and into which a disk table of a disk driving unit for rotationally driving the optical disk 2 is introduced on loading the disk cartridge 1 into the recording and/or reproducing apparatus. The lower half 4 also has an aperture 8 adapted for radially exposing a part of the signal recording surface of the optical disk 5 to the outside for facing an optical pickup unit. The upper half 3 has an aperture 9 into which a magnetic head is introduced. The apertures 8 and 9 are provided in register with each other towards a front side 12 of the cartridge proper 4 transversely centrally between one side 10 and the other side 11 of the cartridge proper 5 and are each in the form of a rectangle large enough to expose the signal recording surface of the magneto-optical disk 2 partially across the inner and outer peripheries of the disk.

A shutter 13 for closing the apertures 8 and 9 is slidably mounted on the cartridge proper 5. The shutter 13 is produced by bending a thin metal plate or a resin plate or by molding synthetic resin so as to be of a U-shaped cross-section. Thus the shutter 13 is composed of a pair of shutter sections 15 and 16 connected to each other by a web 14. The shutter 13 is slidably mounted on the cartridge proper 5 for clamping the front side 12 of the cartridge proper 5 with the shutter sections 15 and 16 extending over the apertures 8 and 9. A pair of engaging lugs 18 and 19 for engaging in an engaging groove 17 formed in the lower half 4 are segmented from the shutter section 15 in a region close to the web 14. The shutter 13 is slidably mounted on the cartridge proper 5 with these engaging lugs 18 and 19 engaging in the engaging groove 17 so as to be controlled in its sliding movement and prevented from accidental extrication.

Within the cartridge proper 5, there is provided a torsion coil spring 20 as biasing means for perpetually biasing the shutter 13 in a direction of closing the apertures 8 and 9. This torsion coil spring 20 has its one end retained by a corner on the front side 12 of the cartridge proper 5 and its other end retained by a spring retention section 21 segmented from the web 14 of the shutter 13 for biasing the shutter 13 in the direction of closing the apertures 8 and 9 as shown by an arrow a in FIG. 2.

At the other corner on the front side 12 of the cartridge proper 4, there is provided a shutter locking member 22 for locking the shutter 13 in the position of closing the apertures 8 and 9 when the shutter is at this position. The shutter locking member 22 is formed of synthetic resin and is flexible or elastically deflectable. The shutter locking member 22 is mounted within the inside of the cartridge proper 5 so that a locking section 24 having an engaging recess 23 on its lateral side is protruded into a shutter opening/closing member inserting groove 25 formed on the front side 12 of the cartridge proper 5. When the shutter 13 reaches a position of closing the apertures 8 and 9, as shown in FIGS. 1 and 2, the shutter locking member 22 locks the shutter 13 in the closure position, with a locking piece 26 segmented from the web 14 of the shutter 13 engaging with the engaging recess 23.

On the front side 12 of the cartridge proper 5, there is formed the above mentioned groove 25 engaged by the shutter opening/closing member provided on the recording/reproducing apparatus for unlocking the shutter 13 from the shutter locking member 22 and displacing the shutter 13 in a direction shown by an arrow B in FIGS. 1 and 2 against the force of the coil spring 20. The groove 25 is formed over the sliding range of the shutter 13 beginning from the side 10 of the cartridge proper 5 lying orthogonally relative to the sliding direction of the shutter 13. The end of the groove 25 opening on the side 9 of the cartridge proper 5 is an opening end 25a by means of which the shutter opening/closing member provided on the recording and/or reproducing apparatus is introduced.

The lower half 4 of the cartridge proper 5 has a pair of positioning pin engaging holes 27, 27 into which positioning pins for setting the horizontal loading position of the disk cartridge 1 are engaged on loading the disk cartridge 1 into the recording and/or reproducing apparatus.

The lower half 4 also has disk type discriminating holes 28 and 29 for discriminating the types of the optical disks accommodated in the disk cartridge 1 and a mistaken recording inhibiting member 30.

The disk cartridge 5 needs only to be large enough to accommodate the magneto-optical disk 2 having the diameter R1 of approximately 64 mm, as mentioned previously. Thus the cartridge proper 5 has a width W1 along the sliding direction of the shutter 13 equal to 68 mm, a width W2 along the direction normal to the sliding direction of the shutter 13 equal to 72 mm and a thickness D equal to 5 mm. Meanwhile, the width W2 of the cartridge proper 5 normal to the sliding direction of the shutter 13 is selected to be larger than the width W1 along the sliding direction of the shutter 12 in order to conserve a space for accommodating the torsion coil spring 20 and the shutter locking member 22 on the front side 12 of the cartridge proper 5.

It is noted that, since the magneto-optical disk 2 capable of rewriting recorded signals is accommodated in the disk cartridge 1, it is necessary for the magnetic head to be introduced into the cartridge proper 5 by means of the aperture 9. Thus the cartridge proper 5 constituting the disk cartridge 1 is provided with a notch 31 indicating that the disk accommodated in the cartridge proper is the overwrite type magneto-optical disk 2 and enabling the magnetic head to be introduced into the cartridge proper 5. As shown in FIGS. 1 and 2, the notch 31 is provided on the side 10 of the cartridge proper 5.

The recording and/or reproducing apparatus according to the present invention also has the optical pickup unit, as will be explained subsequently, so that a reproduce-only optical disk may also be used as a recording medium.

Figure 3:
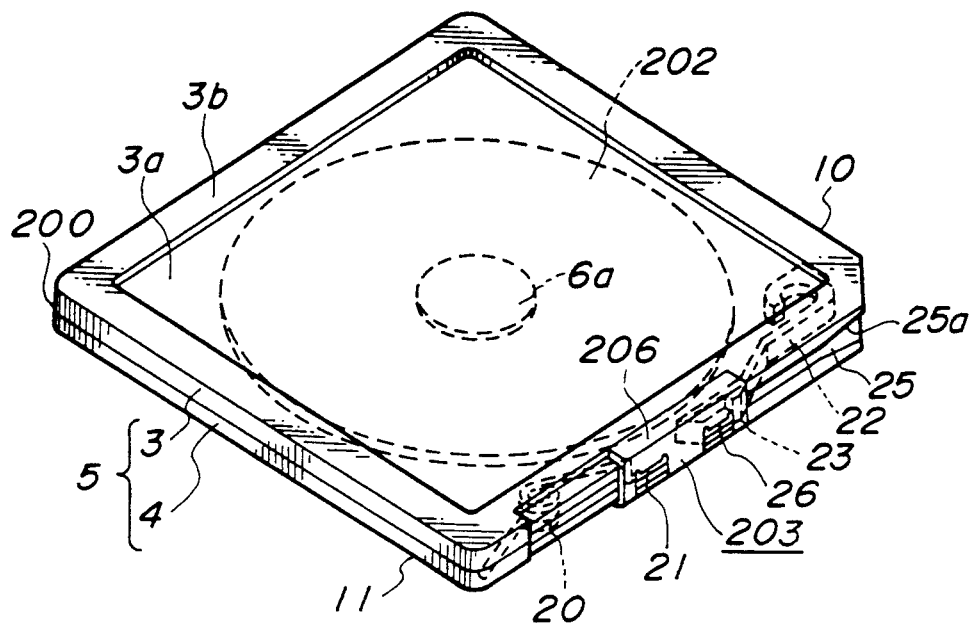
FIG. 3 is a perspective view, as seen from above, of a disk cartridge accommodating an optical disk and adapted to be loaded into a recording and/or reproducing apparatus for an optical disk according to the present invention.
Figure 4:
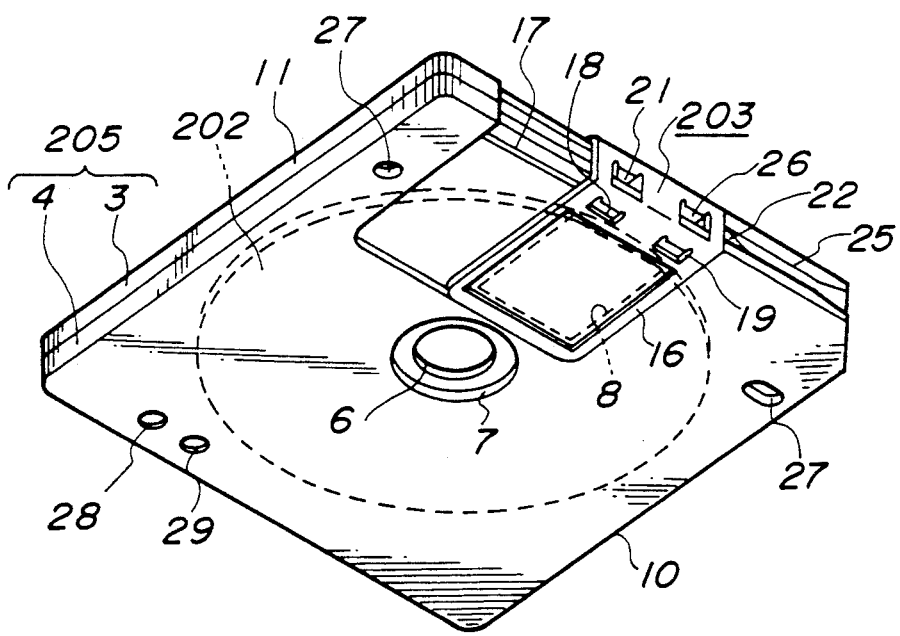
FIG. 4 is a perspective view, as seen from below, of the disk cartridge shown in FIG. 1.

While the magneto-optical disk 2 has a photomagnetic recording layer on a disk base plate having pregrooves as a recording guide, the reproduce-only optical disk 202 shown in FIGS. 3 and 4 has a reflection film of Al or Au of high reflection index on a disk base plate on which a pattern of projections and valleys are formed in a spiral or concentric pattern. Alternatively, the reproduce-only optical disk 202 may be the above mentioned magneto-optical disk on which information signals are recorded previously. Since there is no necessity of providing a magnetic head for generating an external magnetic field for recording information signals on the magneto-optical disk 2, the upper half 3 of the disk cartridge 200 accommodating the reproduce-only optical disk 202 is not provided with an aperture but is solid throughout in a manner different from the disk cartridge 1 accommodating the magneto-optical disk 2. However, a central region 3a of the major surface 3a of the upper half 3 is recessed relative to a nearby region 3b so as to be used as a region for applying a label or the like. The lower half 4 is provided with the aperture 8 to be exposed to the optical pickup unit, as shown in FIG. 4. On the other hand, since it is unnecessary for the shutter 203 mounted on the disk cartridge 200 to close the upper half 3 of the cartridge proper 205, the shutter is not provided with a section extending over the upper half 3, as shown in FIG. 3. However, there is provided a supporting lug 206 for supporting a portion of the front side of the upper half 3 for assuring positive sliding of the shutter 203 relative to the cartridge proper 205 and preventing accidental extrication of the shutter 203 from the cartridge proper 205.

For assuring discrimination between the disk cartridge 1 and the disk cartridge 200, the disk cartridge 200 is not provided with the notch 31 which is provided in the disk cartridge 1 for indicating that the disk is the magneto-optical disk.

It is noted that, except for the above mentioned differences in construction, the disk cartridge 200 accommodating the optical disk 202 is similar to the disk cartridge 1 as to the size, the mechanism for closing and locking the shutter 203 or as to the groove 25 to be engaged by the shutter opening/closure member. Therefore, the same parts or components are depicted by the same reference numerals and a detailed description is omitted for simplicity.

A magnetic plate 6a is provided about the rim of the centering hole 6 of the magneto-optical disk 2 or the optical disk 202 accommodated in the disk cartridge 1 or 200 for enabling the disk cartridge 1 or 200 to be loaded onto the disk table of the disk driving unit by taking advantage of the magnetic force of attraction of magnetic attracting means, such as a permanent magnet, provided in the disk driving unit.

Figure 5:
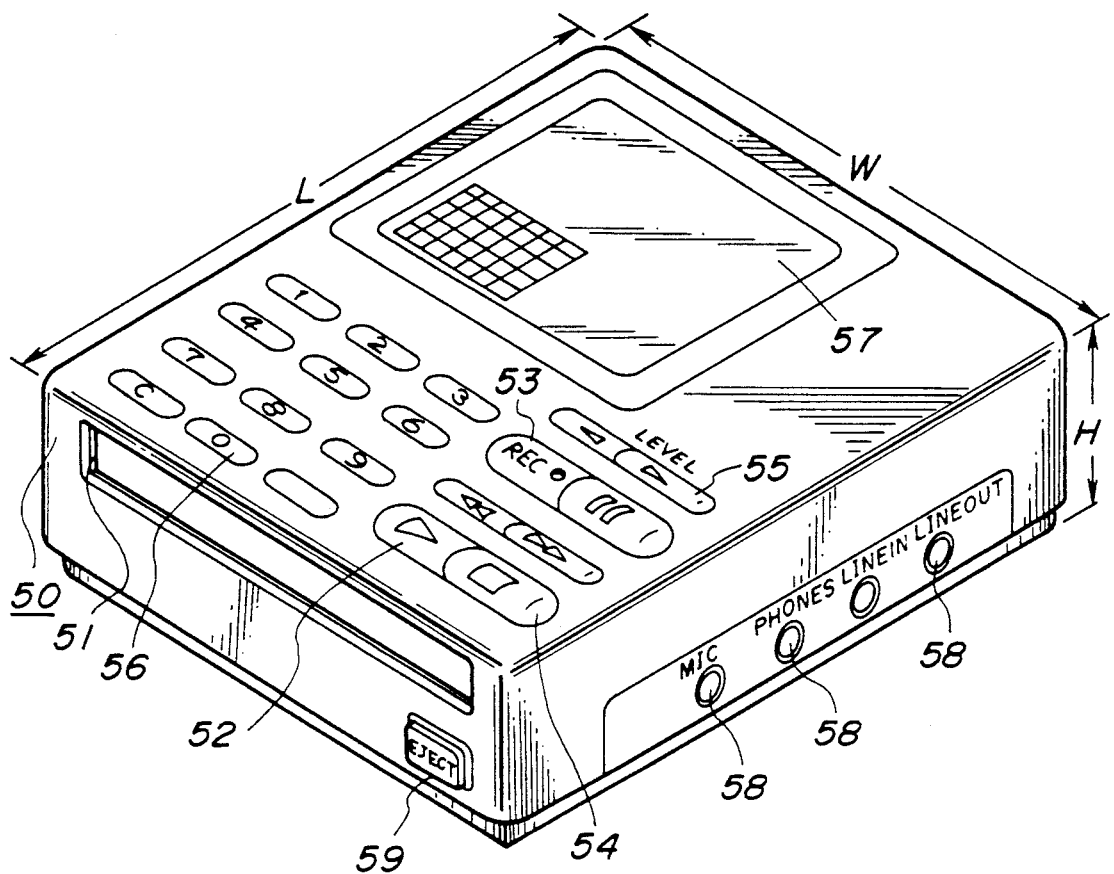
FIG. 5 is a perspective view showing the recording and/or reproducing apparatus for an optical disk according to the present invention.

A recording and/or reproducing apparatus for an optical disk, employing the above described disk cartridge 1 or 200 as a recording medium, is hereinafter explained with reference to FIGS. 5 to 7.

The recording and/or reproducing apparatus for an optical disk is so constructed and arranged that the above mentioned disk cartridge 1 or 200 is loaded therein and information signals may be recorded on or reproduced from the magneto-optical disk 2 or information signals recorded on the optical disk 202 may be reproduced from the optical disk 202.

The recording and/or reproducing apparatus for an optical disk is of such a size that the disk cartridge 1 or 200 may be loaded therein and that the apparatus may be rendered portable by being held by the user's hand or attached to the user's body. Thus an outer casing 50 of the main body of the apparatus has a length L of not longer than 112 mm, a width W of not wider than 89 mm and a height H of not higher than 31 mm. In the present preferred embodiment, the outer casing 50 has the length L of 112 mm, the width W of 89 mm and the height H of 31 mm.

The front side of the outer casing 50 has a cartridge inserting and take/out aperture 51 by means of which the disk cartridge 1 or 200 may be introduced into or taken out of the outer casing. This cartridge inserting/takeout aperture 51 is large enough in size to permit the disk cartridge 1 or 200 to be introduced or taken out with the sliding direction of the shutter 13 or 203 as the inserting or taking out direction. The upper side of the outer casing 50 is provided with control buttons for controlling the recording/reproducing operation, such as a playback start button 52, a recording button 53, a stop button 54 or a playback output adjustment button 55, selection buttons 56 for selecting and designating information signals recorded on the magneto-optical disk 2 or on the optical disk 202, and a display section 57 for displaying operating modes of the apparatus or display information for information signals being recorded and/or reproduced. A lateral side of the outer casing 50 normal to the side thereof provided with the aperture 51 is provided with jacks 58, such as a microphone connecting jack, earphone connecting jack or the like. The front side of the outer casing provided with the aperture 51 is also provided with an eject button 59 for ejecting the disk cartridge 1 or 200 loaded into the apparatus.

A lid, not shown, may be provided to cover the aperture 51 to prevent dust and dirt from being intruded into the inside of the outer casing 50.

Figure 6:
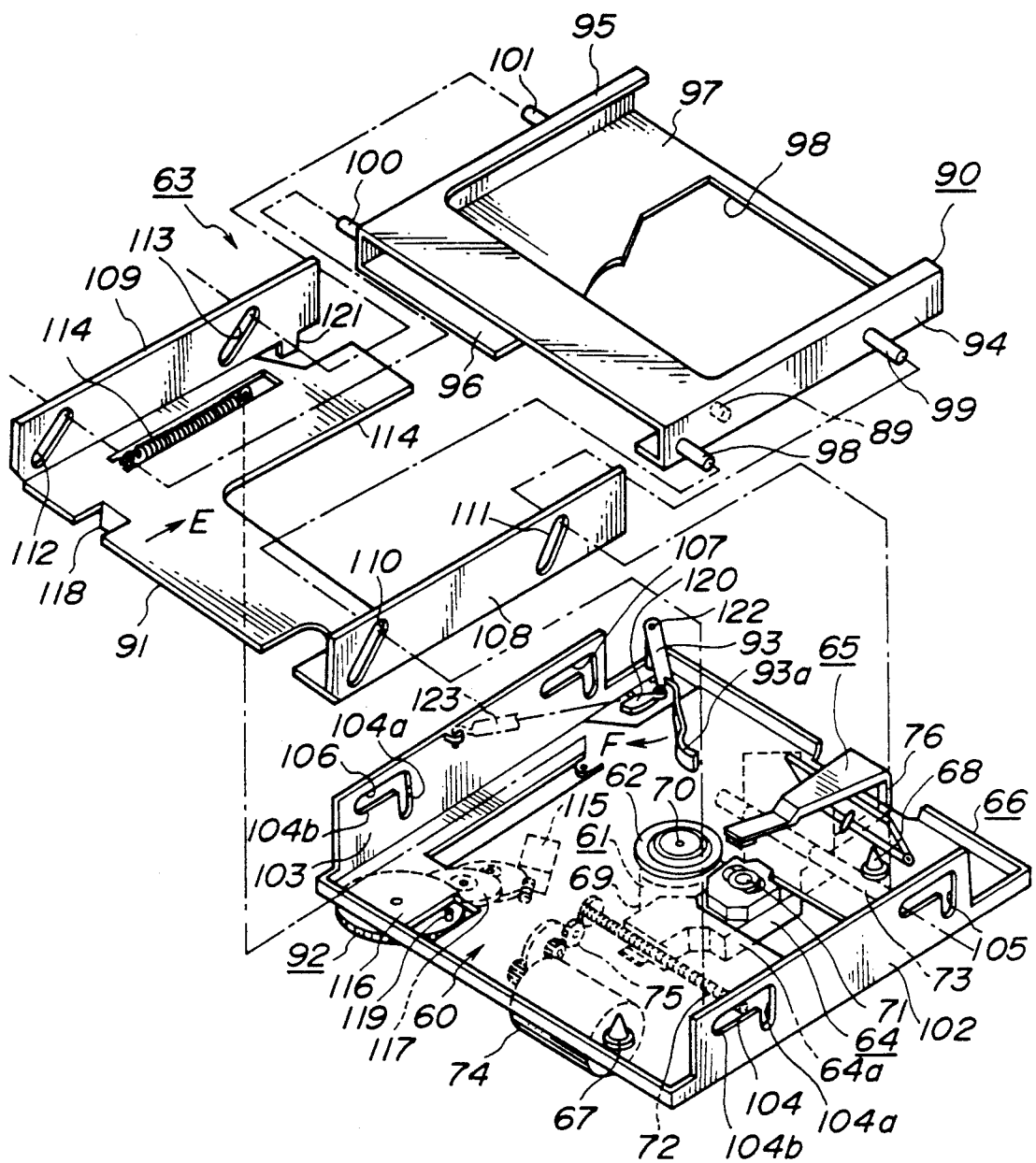
FIG. 6 is an exploded perspective view showing a mechanical unit block provided within an outer casing.
Figure 7:
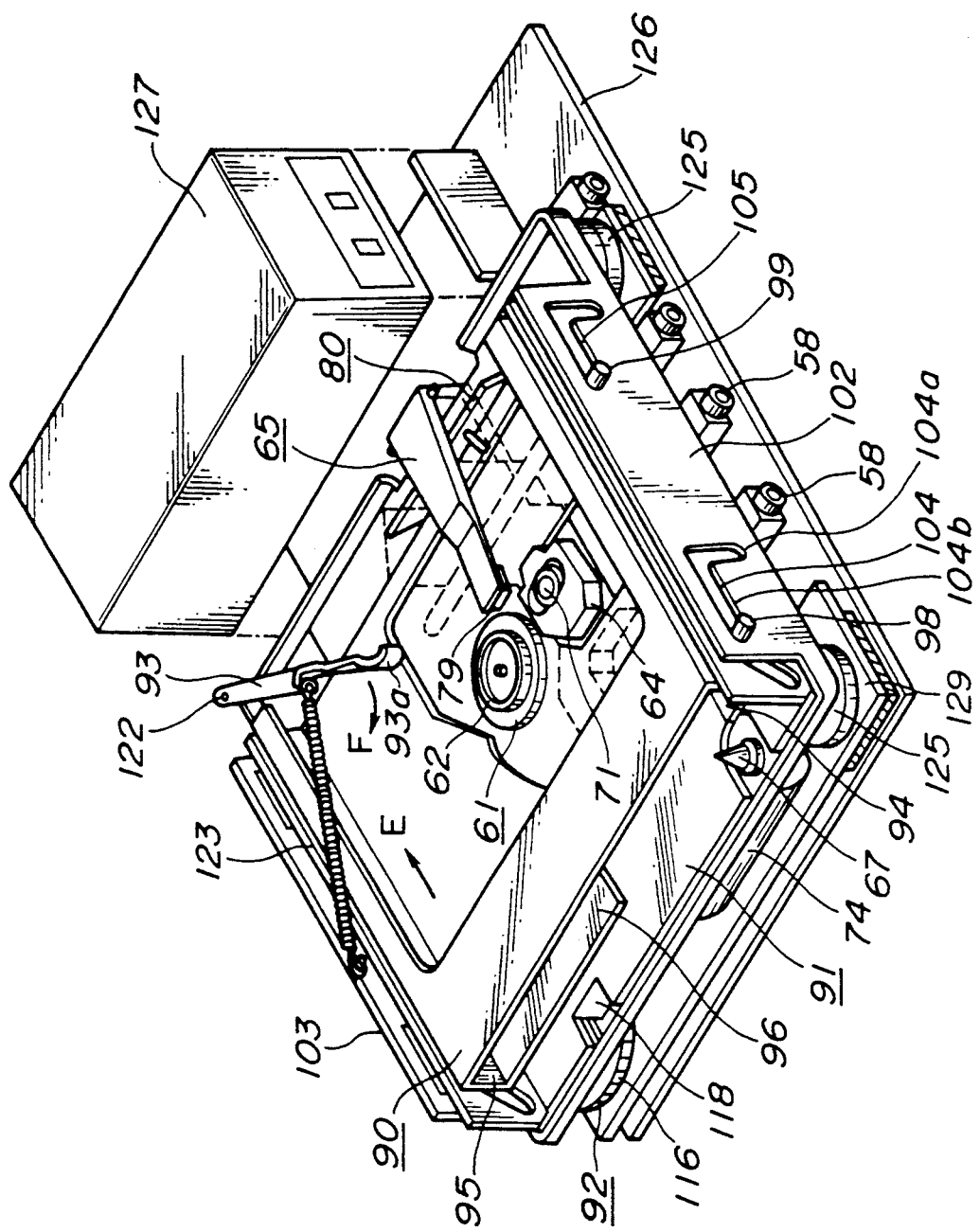
FIG. 7 is a perspective view showing the inside of the outer casing.

Within the above described outer casing 50, as shown in FIGS. 6 and 7, there are provided devices or units for recording and/or reproducing information signals on or from the magneto-optical disk 2 or the optical disk 202, such as a disk loading unit 63 for loading the disk cartridge 1 or 200 introduced into the outer casing 50 onto a cartridge loading section 60 and loading the magneto-optical disk 2 or the optical disk 202 onto the disk table 62 of the disk driving unit 61, an optical pickup unit 64 transported across the inner and outer peripheries of the magneto-optical disk 2 or the optical disk 202 loaded on and rotated with the disk table 62 for recording information signals on the magneto-optical disk 2 or reproducing information signals recorded on the magneto-optical disk 2 or on the optical disk 202, or a magnetic head device 65 for furnishing an external magnetic field for recording information signals on the magneto-optical disk 2.

The cartridge loading section 60, provided within the outer casing 50, is provided on a chassis base plate 66, on which the disk driving unit 61 or a transporting unit for the optical pickup unit 64 are mounted. Thus the cartridge loading section 60 is so designed as to provide a space ample enough to load the disk cartridge 1 or 200 above the upper surface of the chassis base plate 66. Positioning pins 67 and 68 for engaging with engaging holes 27 and 28 in the disk cartridge 1 or 200 are mounted upright on the cartridge loading section 60. On loading the disk cartridge 1 or 200 onto the cartridge loading section 60, the positioning pins 67 and 68 are engaged in the engaging holes 27 and 28 for loading the disk cartridge 1 or 200 in position with respect to the cartridge loading section 60.

At a mid portion of the chassis base plate 66, on which the cartridge loading section 60 is mounted, there is mounted the disk driving unit 61 for rotationally driving the magneto-optical disk 2 of the disk cartridge 1 or the optical disk 202 of the disk cartridge 200. The disk driving unit 61 is mounted with a driving motor 69 mounted on the lower side of the chassis base plate 66 and with a spindle shaft 70 protruding towards the cartridge loading section 60. The distal end of the spindle shaft 70 is fast with the disk table 62 for rotationally driving the magneto-optical disk 2 or the optical disk 202. Since the disk table 62 is provided with the function of rotating the magneto-optical disk 2 or the optical disk 202 in unison therewith, it is provided with a disk-attracting magnet for securing the magneto-optical disk 2 or the optical disk 202 thereto under magnetic attraction.

The optical pickup unit 64 is supported on the chassis base plate 66 by means of a feed screw 72 and a feed guide shaft 73 mounted on the lower side of the chassis base plate 66 for facing an object lens 71 adapted for converging a laser beam on a signal recording surface of the magneto-optical disk 2 or the optical disk 202 attached on the disk table 62. The optical pickup unit 64, supported in this manner, is transported across the inner and the outer peripheries of the magneto-optical disk 2 or the optical disk 202 on actuating a pickup feed motor 74 for rotationally driving the feed screw 72.

It is noted that the pickup feed motor 74 and the feed screw 72 are connected to each other by a speed-reducing gearing unit 75.

Figure 9:
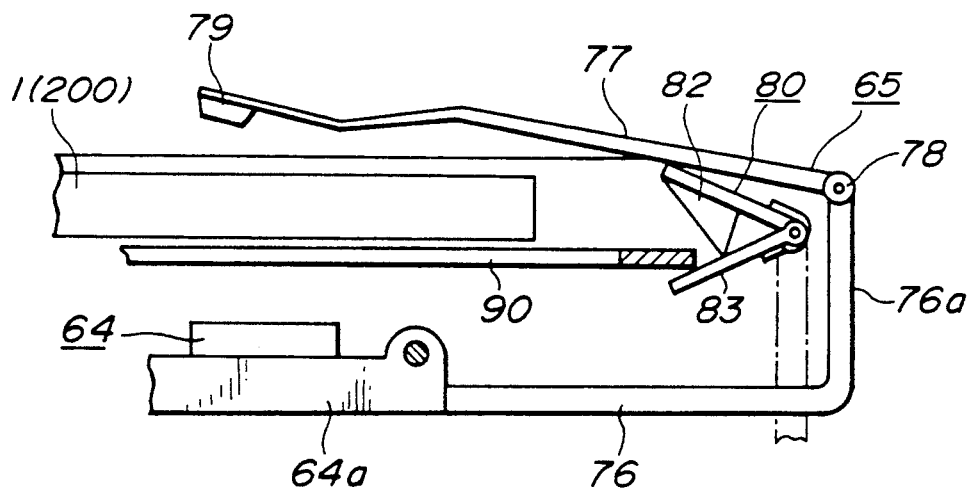
FIG. 9 is a side elevation showing the control unit and a part of the magnetic head unit.

The magnetic head unit 65 is connected to the optical pickup unit 64 so as to be transported across the inner and outer peripheries of the optical pickup unit 64 in synchronism with the optical pickup unit 64. Turning to FIG. 9, the magnetic head unit 65 is connected to the optical pickup unit 64 by having the proximal end of a magnetic head supporting arm 77 supported by the distal end of a supporting piece 76a upstandingly formed on the distal end of a connecting arm 76 having its one end connected to a housing 64a for an optical system of the optical pickup unit 64. The magnetic head supporting arm 77 is rotatably supported by a pivot 78 with respect to the supporting piece 76a so that a magnetic head 79 mounted on the distal end of the arm 77 may be moved into contact with or away from the magneto-optical disk 2 attached to the disk table 62. Meanwhile, the magnetic head supporting arm 77 is rotationally biased by biasing means, not shown, in a direction in which the magnetic head 79 mounted on its end is slidingly contacted with the magneto-optical disk 2 loaded on the disk table 62, with a contact pressure of the order of 2 to 3 g with respect to the magneto-optical disk 2. To this end, a member having a surface with a low frictional coefficient is formed as one with the magneto-optical disk 2 on the surface of the magneto-optical disk 2 facing the magnetic head.

The magnetic head unit 64 need to be so constructed and designed that, when the disk cartridge 1 having accommodated therein the magneto-optical disk 2 is loaded onto the cartridge loading section 60, the magnetic head 79 is introduced into the cartridge proper 5 via aperture 9 into sliding contact with the magneto-optical disk 2. When the disk cartridge 200 having accommodated therein the read- or reproduce-only optical disk 202 and hence not provided with the aperture 9 to be exposed to the magnetic head is loaded, the magnetic head is maintained at a position removed from the surface of the disk cartridge 200 to prevent a sliding contact of the magnetic head with the disk cartridge 200 for preventing possible damage to the magnetic head 79 due to contact with the disk cartridge surface. Thus the present recording and/or reproducing apparatus, into which the disk cartridge 1 having accommodated therein the magneto-optical disk 2 capable of recording information signals or the disk cartridge 200 having accommodated therein the read- or reproduce-only optical disk 202 may be loaded selectively, is provided with a magnetic head contact/non-contact controlling unit 80 for discriminating whether the loaded disk cartridge is the disk cartridge 1 or 200 and for controlling the coming into or out of contact of the magnetic head 79 with the magneto-optical disk 2 or the optical disk 202. Turning again to FIGS. 6 and 7, the controlling unit 80 is provided inwardly of the cartridge loading section 60 and in opposition to the inserting direction of the disk cartridge 1 or 200.

Figure 8:
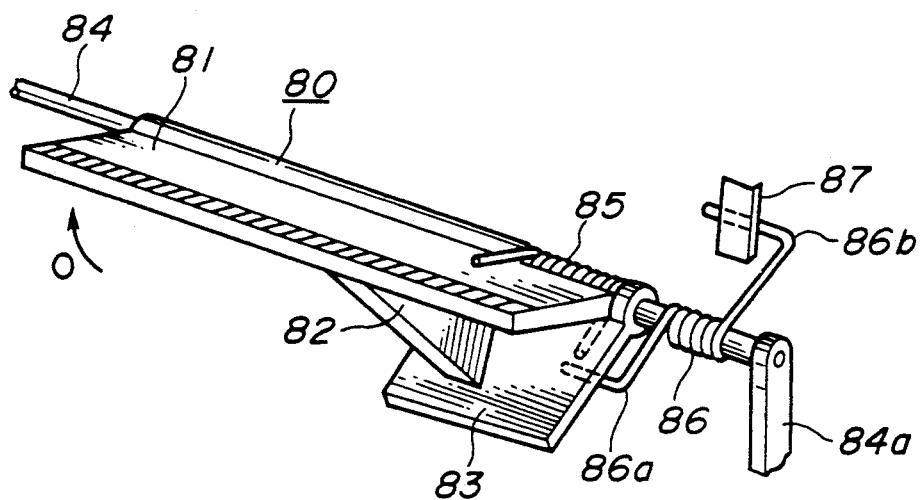
FIG. 8 is a perspective view showing a control unit for bringing a magnetic head into and out of contact.

As shown in FIGS. 8 and 9, the controlling unit 80 is provided with a rotation controlling plate 81 for controlling the pivoting of the magnetic head supporting arm 77 of the magnetic head unit 64 for controlling the coming into or out of contact of the magnetic head 79 with the magneto-optical disk 2 or the optical disk 202 on the disk table 62, and a cartridge discriminating piece 82 for discriminating between the disk cartridge 1 and the disk cartridge 200 loaded on the cartridge loading section 60 for controlling the pivoting of the controlling plate 81. The controlling plate 81 is rotatably supported on a pivot 84 carried by a supporting piece 84a mounted upright on the chassis base plate 66. The cartridge discriminating piece 82 is wedge shaped and mounted normal to the inner lateral surface of the controlling plate 81. The discriminating piece 82 is mounted at a position in register with the magneto-optical disk indicating notch 31 formed in the disk cartridge 1 loaded into the loading section 60. A rotation-biasing plate 83 is rotatably mounted on the pivot shaft 84 with the discriminating piece 82 in-between. The rotation-biasing plate 83 and the controlling plate 81 fitted with the cartridge discriminating piece 82 are biased toward each other by a rotation-biasing spring 85 placed about the pivot shaft 84. The controlling plate 81 and the rotation-biasing plate 83, thus unified by the rotation-biasing spring 85, are together rotationally biased by a torsion coil spring 86 placed about the pivot shaft 84, in a direction shown by an arrow O in FIGS. 8 and 9, for rotationally biasing the magnetic head supporting arm 77 placed on the controlling plate 81 in a direction away from the magneto-optical disk 2 or the optical disk 202 placed on the disk table 62. The torsion coil spring 86, thus rotationally biasing the controlling plate 81 is mounted on the pivot shaft 84 by having its one arm 86a retained by the spring-biased plate 83 and its other arm retained by a retainer 87 provided on the chassis base plate 66 for rotationally biasing the rotation-biasing plate 83 and the controlling plate 81 in the direction of the arrow O in FIGS. 8 and 9.

Figure 11:
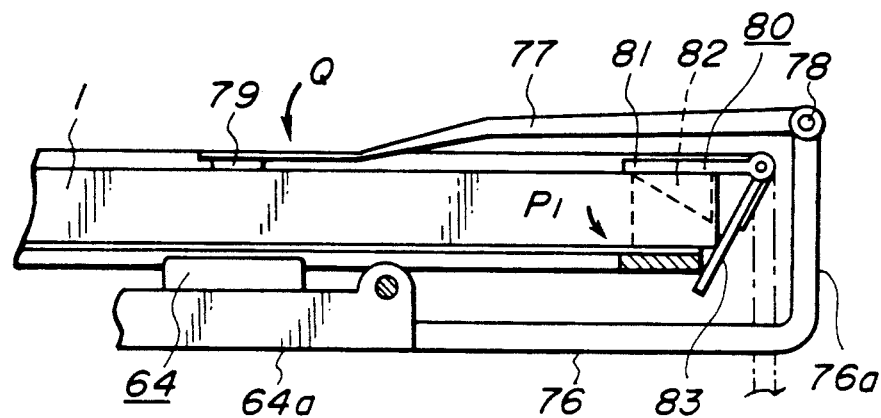
FIG. 11 is a side elevation showing the relation between the control unit and the magnetic head unit when the disk cartridge accommodating a magneto-optical disk is loaded in position.
Figure 12:
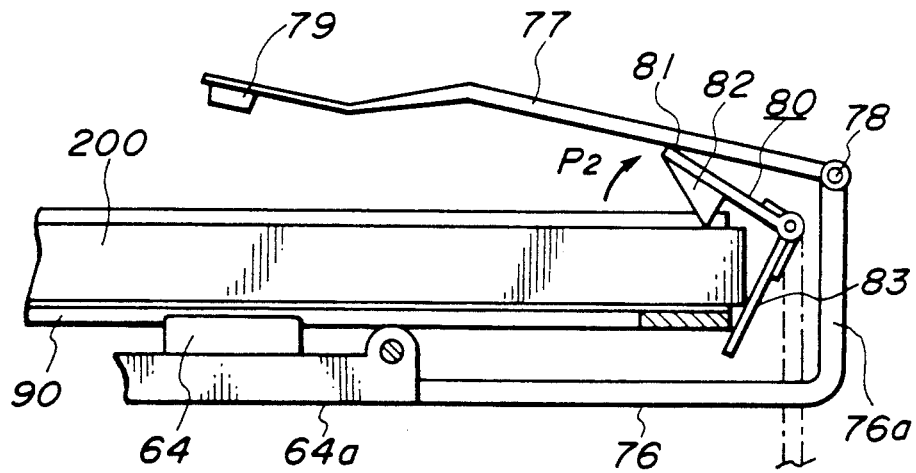
FIG. 12 is a side elevation showing the relation between the control unit and the magnetic head unit when the disk cartridge accommodating an optical disk is loaded in position.

It is noted that the rotation-biasing plate 83 is thrust by a cartridge holder 90 as later described or by the disk cartridge 1 or 200 inserted into the cartridge holder 90 and thereby rotated against the biasing of the torsion coil spring 86, as illustrated in FIGS. 11 and 12.

Figure 10:
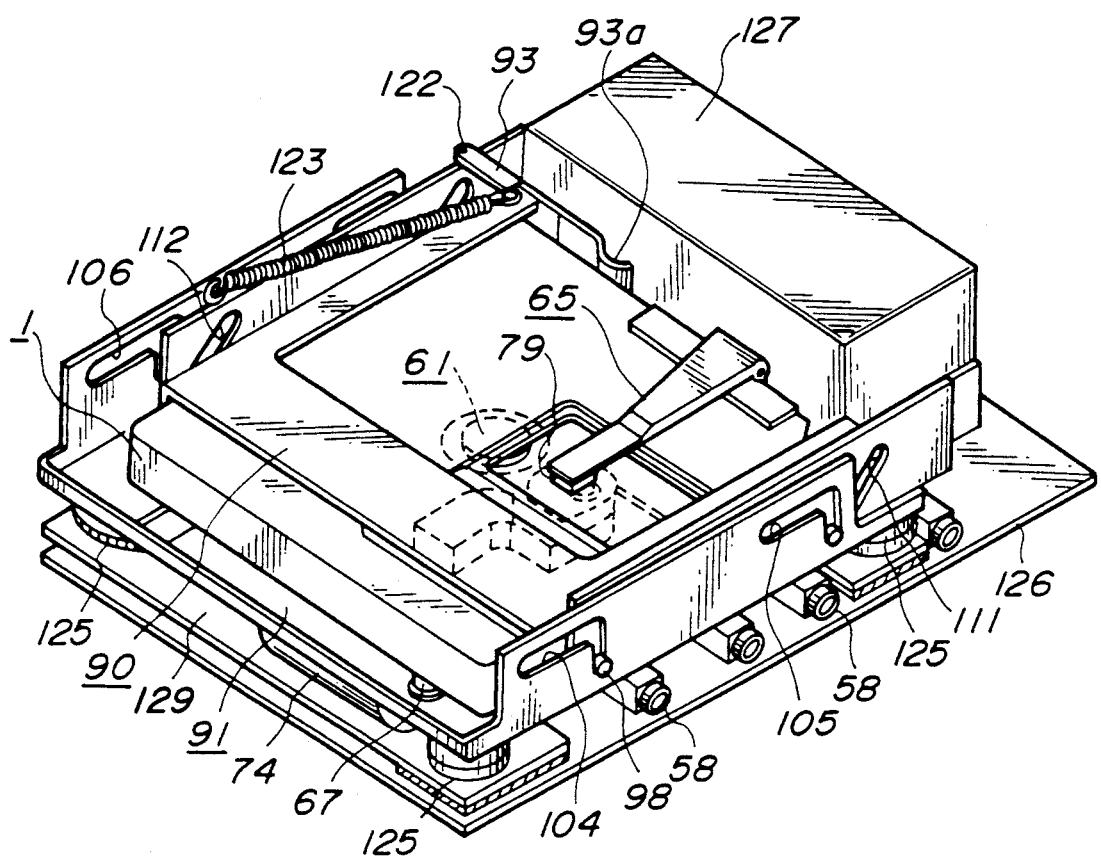
FIG. 10 is a perspective view showing the disk cartridge loaded in position.

Referring to FIGS. 6, 7 and 10, the disk loading unit 63, for loading the disk cartridge 1 or 200 inserted via aperture 51 in the outer casing 50 onto the cartridge loading section 60 is constituted by the cartridge holder 90, for holding the disk cartridge 1 or 200 to be loaded into the recording and/or reproducing apparatus, an ejection plate 91 for moving the cartridge holder 90 vertically with respect to the cartridge loading section 60 and for ejecting the disk cartridge 1 or 200 out of the outer casing 50, an ejection plate driving unit 92 for sliding the ejection plate 91, and a cartridge ejection lever 93 for outwardly ejecting the disk cartridge 1 or 200 inserted into and held by the cartridge holder 90 out of the outer casing 50.

The cartridge holder 90 is substantially in the form of a flat plate large enough to hold the disk cartridge 1 or 200 thereon, and cartridge holding sections 94, 95 having U-shaped cross-section are formed on both sides of the flat plate for holding the disc cartridge 1 or 200. The side of the cartridge holder 90 facing the cartridge inserting/takeout aperture 51 of the cartridge holder 90 is opened and functions as a cartridge receiving opening 96. A bottom plate 97 of the cartridge holder 90 has an aperture 98 to be exposed to the optical pickup unit 64 and the disk table 62 provided on the chassis base plate 66. The outer lateral sides of the cartridge holding sections 94, 95 are provided with upstanding guide pins 98, 99; 100, 101 for guiding vertical movement. The cartridge holder 90 is supported by having the guide pins introduced and engaged in guide slots 104, 105; 106, 107 provided in upright walls 102, 103 on the opposite sides of the chassis base plate 66. Each of the guide slots 104, 105; 106, 107 is composed of a vertical run, such as a vertical run 104a, extending parallel to the spindle shaft 70 of the disk driving unit 61, and a horizontal section, such as a horizontal section 104b, extending from the vertical run 104a towards the cartridge inserting/takeout aperture 51 in parallel with the inserting direction of the disk cartridge 1 or 200. The cartridge holder 91, supported by the chassis base plate 66 by having the guide pins 98, 99; 100, 101 introduced into these guide slots 104, 105; 106, 107, may be moved vertically in the axial direction of the spindle shaft 70 of the disk driving unit 61 and in the inserting/take-out direction of the disk cartridge 1 or 200, by the guide pins 98, 99; 100, 101 being guided along the guide slots 104, 105; 106, 107.

On an inner lateral side of the cartridge holding section 94 of the cartridge holder 90, a shutter opening/closure pin 89 is provided so as to be introduced into and engaged with the groove 25 of the disk cartridge 1 or 200 inserted into the cartridge holder 90 for unlocking the shutter 13 for opening the shutter 13.

The ejection plate 91 is a flat plate on opposite sides of which upright wall sections 108, 109 are formed. These vertical wall sections 108, 109 are provided with inclined guide slots 110, 111; 112, 113 in which the guide pins 98, 99; 100, 101 provided on the cartridge holder 91 are introduced and engaged. These guide slots 110, 111; 112, 113 are inclined upwards from the cartridge inserting/takeout opening 51 towards the rear. The ejecting plate 91 has a cutout 114 to be exposed to the optical pickup unit 64 and the disk table 62 provided on the chassis base plate 66. The ejection plate 91 is slidably mounted on the chassis base plate 66 and biased inwards as shown by an arrow E in FIG. 6 by a tension spring 114 installed between it and the chassis base plate 66. With the ejection plate 91 biased in this manner, the cartridge holder 90, having the guide pins 98, 99; 100, 101 introduced and engaged in the inclined guide slots 110, 111; 112, 113, is moved in a direction of approaching the disk table 62.

The ejection plate 91, thus biased by the tension spring 114, is slid by the ejection plate driving unit 92, against the bias of the tension spring 114, for displacing the cartridge holder 90 to a raised position spaced apart from the disk table 62 and horizontally to an ejecting position. The ejection plate driving unit 92 is provided with an ejection motor 115 and an ejection plate actuating gear 116. The ejecting motor 115 and the ejection plate actuating gear 116 are interconnected by a connecting gearing 117. An actuating pin 119 for engaging with a retainer 118 segmented from the forward side of the ejection plate 91 is mounted at an offset position of the ejecting plate actuating gear 116. If, with the ejecting plate 91 pulled by the tension spring 114 and the disk cartridge 1 or 200 loaded on the cartridge loading section 60, the ejection button 59 is actuated for driving the ejecting motor 115 for rotationally driving the ejection plate actuating gear 116, the actuating pin 119 abuts on and thrusts the retainer 118 for sliding the ejecting plate 91 against the bias of the tension spring 114 for shifting the plate 91 to an ejecting position. With the ejecting plate 91 thus slid to the ejecting position, the cartridge holder 90 is displaced to a raised position removed from the disk table 62 while being displaced horizontally to an ejecting position, as shown in FIG. 7.

The ejecting plate 91, thus slid to the ejecting position, is maintained in the above mentioned ejecting position, by being locked by a locking lever 120 (see FIG. 6) actuated into rotation by the cartridge ejecting lever 93. The locking lever 120 is mounted on the rear side of the chassis base plate 66 under the rotational bias of a spring, not shown, so that, when the ejecting plate 91 is in the ejecting position, the locking lever 120 is engaged with a locking piece 121 of the ejecting plate 91 for locking the ejecting plate 91 in the ejecting position.

The cartridge ejecting lever 93 is rotatably supported by a supporting shaft 122 mounted on the rear side of the chassis base plate 66 with a distal side cartridge thrusting section 93a facing the rear end face of the cartridge holder 90, as shown in FIGS. 6, 7 and 10. The cartridge ejecting lever 93 is rotationally biased by a tension spring 123 installed between it and the upright wall section 103 of the chassis base plate 66 in a direction shown by an arrow F in FIGS. 6 and 7 in which the cartridge thrusting section 93a is protruded inwardly of the cartridge holder 90.

The mechanical block unit, composed of the disk driving unit 61, optical pickup unit 64 and the cartridge loading unit 63 assembled together by the chassis base plate 66, is stationarily supported via a vibration damper 125 on a bottom plate 126 constituting the outer casing 50.

At the rear side within the outer casing 50 accommodating the above mentioned mechanical unit block, a battery storage section 127, accommodating a battery for supplying a power source necessary for driving the apparatus, is provided and placed on the bottom plate 126;

A printed circuit board 129 constituting an electric circuit of the recording and/or reproducing apparatus is mounted on the bottom plate 126.

The operation of loading the above mentioned disk cartridge 1 or 200 into the recording and/or reproducing apparatus is hereinafter explained.

In the first place, the operation of loading the disk cartridge 1 having accommodated therein the magneto-optical disk 2 is explained.

For loading the disk cartridge 1, ejection button 59 is actuated for displacing the ejection plate 91 to an ejecting position, as shown in FIG. 7, thereby displacing the cartridge holder 90 towards the cartridge inserting-/takeout aperture 51 to the raised position removed from the disk table 62 of the disk driving unit 61.

In this state, the disk cartridge 1 is introduced from the aperture 51 into the cartridge holder 90 within the outer casing 50, with the sliding direction of the shutter 13 as the inserting direction and with the side 10 as the inserting side. When the disk cartridge is inserted into the cartridge holder 90, the shutter opening/closing pin 89 provided on the cartridge holding section 94 is intruded into the groove 25 via the opening end 25a. When the disk cartridge 1 is further introduced from this state into the cartridge holder 90, the shutter locking member 22 is flexed by the shutter opening/closing pin 89 for unlocking the shutter 13, with the one side of the shutter 13 then abutting on the shutter opening/closing pin 89. When the disk cartridge 1 is further intruded from this position into the cartridge holder 90, the shutter 13 is displaced for opening the apertures 8 and 9 by the shutter opening/closure pin 89 against the bias of the torsion coil spring 20. The side 10 of the disk cartridge 1 then thrusts against the cartridge thrusting section 93a of the cartridge ejecting lever 93 provided at the back of the shutter base plate 66 for rotating the lever 93 in a direction opposite to that shown by an arrow F in FIG. 7 against the bias of the tension spring 123.

With the cartridge ejecting lever 93 thus rotated, the locking lever 120 of the ejecting plate 91 is rotated for unlocking the ejecting plate 91. The ejecting plate 91 is slid by the tension spring 114 in a direction shown by an arrow E in FIG. 7. At this time, the guide pins 98, 99; 100, 101 are moved along the inclined guide slots 110, 111; 112, 113, with the cartridge holder 90 being moved in the same direction. Concomitantly with the above movement, the guide pins 98, 99; 100, 101 are guided along guide slots 104, 105; 106, 107, so that the cartridge holder 90 is lowered along the axis of the spindle shaft 70 of the disk driving unit 61 for loading the disk cartridge 1 in position on the cartridge loading section 60. Simultaneously, the magneto-optical disk 2 is loaded on the disk table 62.

When the disk cartridge 1 is introduced into the cartridge holder 90 as described above, the side 10 of the disk cartridge 1 is faced by the cartridge discriminating piece 82 of the control unit 80. When the disk cartridge 1 is further introduced into the cartridge holder 90, the side 10 of the disk cartridge 1 abuts on the cartridge discriminating piece 82, at the same time that the side 10 abuts on the rotation-biasing plate 83 for biasing the plate 83 in a direction shown by an arrow P1 in FIG. 11 against the bias of the torsion coil spring 86. At this time, if the loaded disk cartridge 1 is that accommodating the magneto-optical disk 2, the cartridge discriminating piece 82 descends into engagement with the magneto-optical disk indicating notch 30 formed in the disk cartridge 1. With the cartridge discriminating piece 82 thus engaged with the notch 31, the control plate 81 is rotated in unison with the rotation-biasing plate 83 in a direction shown by an arrow P1 in FIG. 11 under the bias of the rotation-biasing spring 85. As a result, the magnetic head supporting arm 77 of the magnetic head unit 64, so far supported by the control plate 81, is no longer supported, so that the supporting arm 77 is rotated towards the disk cartridge 1 in a direction shown by an arrow Q in FIG. 11. Thus the magnetic head 79 on the distal end of the arm 77 is intruded via aperture 9 into the cartridge proper 5 and into contact with the magneto-optical disk 2, as shown in FIG. 10. In this state, a recording power level light beam is irradiated by the optical pickup unit 64 on the magneto-optical disk 2, at the same time that the external magnetic field modulated in accordance with information signals by the magnetic head unit 65 is applied to the magneto-optical disk 2, so that the information signals are recorded on the recording film of the magneto-optical disk 2 in accordance with the direction of the external magnetic field applied by the magnetic head unit 65.

Conversely, if the disk cartridge inserted into the cartridge holder 90 is the disk cartridge 200 accommodating the reproduce-only optical disk 202, since the magneto-optical disk indicating notch 31 is not provided in the disk cartridge 200, the cartridge discriminating piece 82 is supported or thrust by the side 10 of the disk cartridge 200, so that the rotation controlling plate 81 is rotated in a direction shown by arrow P2 in FIG. 12 for rotating the arm 77 in a direction away from the disk cartridge 200 to cause the magnetic head 79 to clear the cartridge proper 5.

With the above described recording and/or reproducing apparatus for an optical disk according to the present invention, it is discriminated whether the loaded disk cartridge is the disk cartridge 1 accommodating the magneto-optical disk 2 or the disk cartridge 200 accommodating the optical disk 1 for selecting the loading state of the disk cartridge. If the loaded disk cartridge is the disk cartridge 1 having accommodated therein the magneto-optical disk 2, both the optical pickup unit 64 and the magnetic head unit 65 are caused to face the magneto-optical disk 2 to enable recording and/or reproduction of the information signals. If the loaded disk cartridge is the disk cartridge 200 accommodating the optical disk 1, the magnetic head unit 65 is displaced to a large extent from the disk cartridge 200 to cause the magnetic head 79 to clear the optical disk 303 to cause only the optical pickup unit 64 to approach and face the disk to enable reproduction of the information signals.

Although the magnetic head contact non-contact controlling unit is adapted for detecting the indicating notch 31 provided in the disk cartridge, the disk discriminating holes may be used in place of the notch 31, in which case the discriminating holes 28, 29 may be detected by electrically or mechanically operated detection means and a magnetic head supporting arm normally biased in a direction away from the disk cartridge may be driven by electro-magnetic driving means so as to be actuated in a direction of contacting with the optical disk only when the detection output indicates that the disk accommodated in the disk cartridge is the magneto-optical disk.

What is claimed is:

1. A disk recording and/or reproducing apparatus for recording and/or reproducing information signals on or from a disk accommodated in a disk cartridge, comprising:
    an optical head provided on one surface of the disk accommodated in the disk cartridge loaded in a main body of the apparatus,
    means for generating an external magnetic field, said means for generating an external magnetic field being mounted on another surface of said disk for facing the optical head with the disk in-between and for being fed along the radius of said disk together with said optical head, and
    setting means for normally biasing the means for generating an external magnetic field away from the disk until said disk cartridge is completely loaded in position in said main body and including discriminating means for discriminating the disk cartridge type by detecting the presence or absence of a notch in the cartridge which indicates that the cartridge contains a magneto-optic disk and setting the position of said means for generating an external magnetic field to be spaced away from said disk in the state in which said disk cartridge is completely loaded in position on said main body when the discriminating means detects the absence of said notch.

2. The disk recording and/or reproducing apparatus as claimed in claim 1 wherein said setting means comprises:
    supporting means for rotatably supporting said external magnetic field generating means between the position of approaching the magneto-optical disk and the position of being displaced away from said disk; and
    connecting means connected to said optical head and to which said supporting means is mounted rotatably.

3. The disk recording and/or reproducing apparatus as claimed in claim 1 wherein the means for generating an external magnetic field includes a magnetic head and the setting means comprises:
    a pivot arm for pivotally supporting the magnetic head;
    a controlling plate for controlling a pivoting by the pivot arm to control whether the magnetic head comes into or out of contact with the disk;
    a biasing plate for engagement with an edge of the cartridge as the cartridge is completely loaded in position in the main body;
    a pivot shaft supported by the main body for rotatably supporting both the controlling plate and the biasing plate;
    a discriminating piece for engagement with a portion of the cartridge edge where the notch would normally be located, the discriminating piece being wedge shaped and mounted on the controlling plate to extend perpendicularly toward the biasing plate;
    a first spring mounted about the pivot shaft to rotatably bias the controlling plate and the biasing plate toward each other about the pivot shaft;
    a second spring mounted on the main body for normally rotationally biasing the biasing plate to bear against the discriminating piece so that both the biasing plate and the controlling plate are normally rotated away from the cartridge; and
    wherein when the cartridge is completely loaded in position in the main body the cartridge edge contacts the biasing plate and rotates it against a force of the second spring so that the biasing plate no longer bears against the discriminating piece and when the cartridge does not have the notch, the discriminating piece engages the cartridge edge and rotates the controlling plate about the pivot shaft against a force of the first spring to thereby cause the pivot arm to support the magnetic head out of contact with the disk.

4. An optical disk recording and reproducing apparatus for use with either one of a cartridge having accommodated therein an optical disk or a cartridge having accommodated therein a magneto-optical disk, comprising
    a cartridge loading section for loading a disk cartridge,
    a driving unit for rotationally driving a disk accommodated in the disk cartridge,
    an optical pickup unit transported across inner and outer peripheries of the disk driven rotationally by the disk driving unit for recording information signals on or reproducing information signals from the disk,
    a magnetic head unit for generating an external magnetic field based on information signals to be recorded, the magnetic head unit being arranged for facing the optical pickup unit on opposite sides of the disk accommodated in the disk cartridge,
    a disk loading unit for loading the disk cartridge onto the cartridge loading section and loading the disk accommodated in the disk cartridge onto the disk driving unit,
    transporting means for transporting the optical pickup unit across inner and outer peripheries of the disk accommodated in the disk cartridge, the magnetic head unit being connected to the optical pickup unit for movement in unison therewith, and
    controlling means for normally biasing the magnetic head unit above the disk and engaging the disk cartridge and being moved by the disk cartridge to lower the magnetic head unit toward the disk as the disk is loaded by the disk loading unit onto the disk driving unit, the controlling means including disk type discriminating means for engaging with a discriminating notch in the disk cartridge and for biasing the magnetic head unit to remain spaced above the disk, even when the disk is loaded onto the disk driving unit, when the cartridge lacks the discriminating notch.

* * * * *